(12) United States Patent
Kang

(10) Patent No.: US 6,639,884 B2
(45) Date of Patent: Oct. 28, 2003

(54) METHOD AND APPARATUS FOR CONTROLLING HIGH-SPEED ROTATION OF OPTICAL DISC

(75) Inventor: Byung-Gyoo Kang, Kyunggido (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/976,104

(22) Filed: Oct. 15, 2001

(65) Prior Publication Data

US 2002/0101807 A1 Aug. 1, 2002

Related U.S. Application Data

(62) Division of application No. 09/311,577, filed on May 14, 1999, now abandoned.

(30) Foreign Application Priority Data

May 15, 1998 (KR) ............................................. 98-17704
May 29, 1998 (KR) ............................................. 98-20746

(51) Int. Cl.[7] ................................................ G11B 7/00
(52) U.S. Cl. ................................. 369/53.18; 369/53.28
(58) Field of Search ........................... 369/44.28, 44.32, 369/53.18, 53.28

(56) References Cited

U.S. PATENT DOCUMENTS 5,140,575 A * 8/1992 Fushiki ................... 369/44.32
6,195,322 B1 * 2/2001 Ohtani et al.
6,256,275 B1 * 7/2001 Eguchi et al. ........... 369/44.32

FOREIGN PATENT DOCUMENTS

JP       10-143991       * 5/1998

* cited by examiner

Primary Examiner—W. R. Young
(74) Attorney, Agent, or Firm—Birch, Stewart, Kolasch & Birch, LLP

(57) ABSTRACT

Method and apparatus for controlling high-speed rotation of optical disc, wherein the amount of disc vibration caused by disc rotation is calculated, and the disc rotation speed is increased based on the calculated amount of disc vibration in order to maximize the data transfer rate under a given amount of disc vibration. The apparatus of the present invention comprises a pickup for retrieving data recorded on an optical disc, a drive unit for driving motors, an R/F unit for equalizing and shaping signals reproduced from the optical disc, a servo unit for controlling the drive unit and detecting sync signals from the output signal of the R/F unit, a digital signal processing unit for retrieving original digital data from the output signal of the R/F unit, a timer for measuring the elapsed time between specific events, and a microprocessor for controlling the rotation speed of the optical disc based on the amount of elapsed time measured by the timer.

4 Claims, 10 Drawing Sheets

{ a SUBSCRIPT: CONVENTIONA METHODS
  b SUBSCRIPT: THE PRESENT METHOD

METHOD AND APPARATUS FOR CONTROLLING HIGH-SPEED ROTATION OF OPTICAL DISC

BACKGROUND OF THE INVENTION

This application is a divisional of application Ser. No. 09/311,577, filed on May 14, 1999, now abandoned the entire contents of which are hereby incorporated by reference and for which priority is claimed under 35 U.S.C. §120; and this application claims priority of Application Nos. 98-17704 and 98-20746 filed in Korea on May 15, 1998 and May 29, 1998, respectively, under 35 U.S.C. §119.

FIELD OF THE INVENTION

The present invention relates to method and apparatus for controlling an optical disc device, and more particularly, but not by way of limitation, to method and apparatus for controlling high-speed rotation of optical disc that can calculate the amount of disc vibration with a goal of increasing the disc rotation speed for maximizing the data transfer rate based on the amount of disc vibration.

DESCRIPTION OF THE RELATED ART

In conventional schemes for controlling the rotation speed of an optical disc, the initial rotation speed of the optical disc is set to a predetermined value $W_o$ without regard to the amount of disc vibration. The initial rotation speed $W_o$ is less than the allowable maximum rotation speed $W_{max}$, so that reliable playback of the optical disc is guaranteed against axial and radial vibration of the optical disc.

In some optical discs like CD-ROM titles, the amount of data recorded on an optical disc is normally not enough to fill the optical disc and so data are recorded only in the inner peripheries of the optical disc. When an optical disc rotates at a constant angular velocity (CAV), the linear velocity of tracks increases from inner peripheries to outer peripheries. In an optical disc having only small amount of recorded data, therefore, the linear velocity of tracks having data recorded thereon is always less than the allowable maximum linear velocity $V_{MAX}$. Accordingly, if an optical disc contains only small amount of data, conventional control schemes cannot provide high data transfer rates.

SUMMARY OF THE INVENTION

It is an object of the present invention to provide method and apparatus for controlling high-speed rotation of an optical disc, capable of estimating the amount of disc vibrations and maximizing the data transfer rate by increasing the disc rotation speed based on the calculated amount of disc vibration.

An apparatus for controlling high-speed rotation of optical disc according to the present invention comprises: a means for retrieving data recorded on the optical disc; a means for checking whether the period of sync signals detected from the retrieved data falls within a predetermined interval; a means for measuring the time that elapses after the optical disc begins to rotate; and a means for adjusting the rotation speed of the optical disc based upon the measured time if the period of sync signals falls within the predetermined interval.

In a method for controlling high-speed rotation of an optical disc according to the present invention, the time that elapses until a predetermined signal is detected from the optical disc is measured, the amount of disc vibration is calculated based on the elapsed time, and the rotation speed of the optical disc is adjusted based upon the calculated amount of disc vibration. In another method for controlling high-speed rotation of an optical disc according to the present invention, the number of track traverse signals is counted after the rotation speed of the optical disc exceeds a threshold value and the elapse time is measured, the amount of disc vibration is calculated based on the number of detected track traverse signals or the elapse time, and the rotation speed of the optical disc is adjusted based upon the calculated amount of disc vibration.

In the method and apparatus according to the present invention, if an optical disc is loaded and driven to rotate at a constant angular velocity, the retrieving means retrieves recorded signals from the optical disc, the time measuring means measures the time that elapses after the optical disc begins to rotate, and the checking means checks whether the period of sync signals detected from the data being retrieved falls within a predetermined interval. If the period of sync signals belongs to the predetermined interval, the adjusting means calculates the amount of disc vibration based on the elapse time and adjusts the rotation speed of the optical disc based on the calculated amount of disc vibration.

BRIEF DESCRIPTION OF THE DRAWINGS

The accompanying drawings, which are included to provide a further understanding of the invention, illustrate the preferred embodiment of this invention, and together with the description, serve to explain the principles of the present invention.

DETAILED DESCRIPTION OF THE PREFERRED EMBODIMENTS

In order that the invention may be fully understood, preferred embodiments thereof will now be described with reference to the accompanying drawings.

Figure 1:
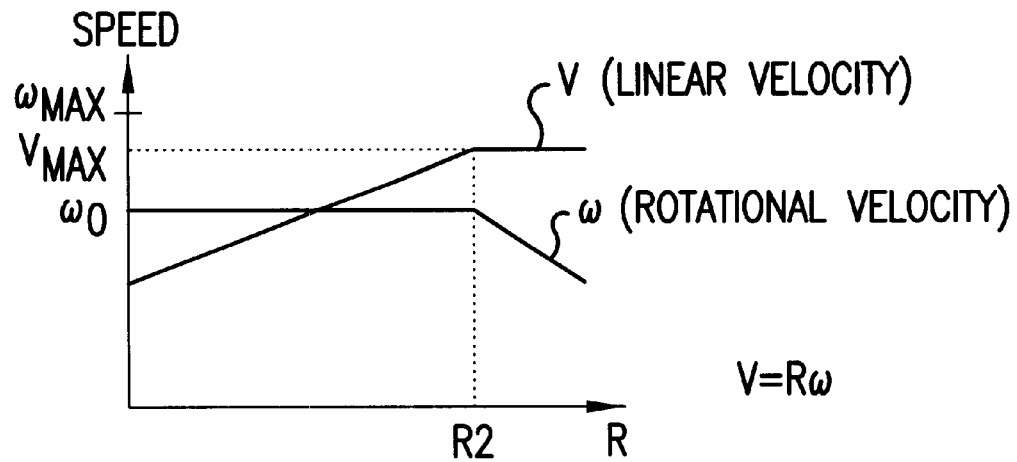
FIG. 1 is a graph illustrating the relation between the disc radius and rotation speed according to conventional control method.
Figure 2:
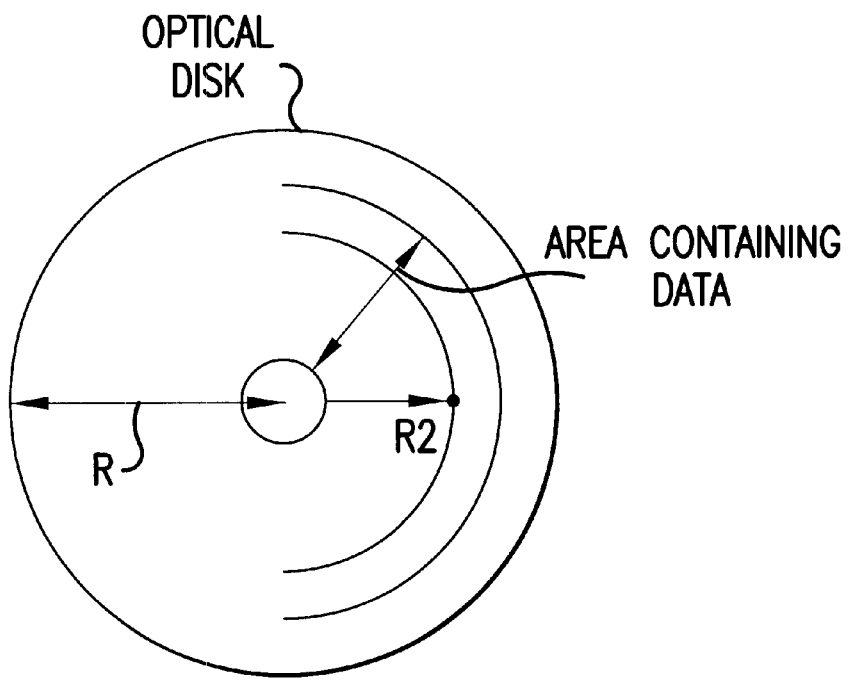
FIG. 2 is a schematic diagram illustrating the data recording area of a CD-ROM.
Figure 3:
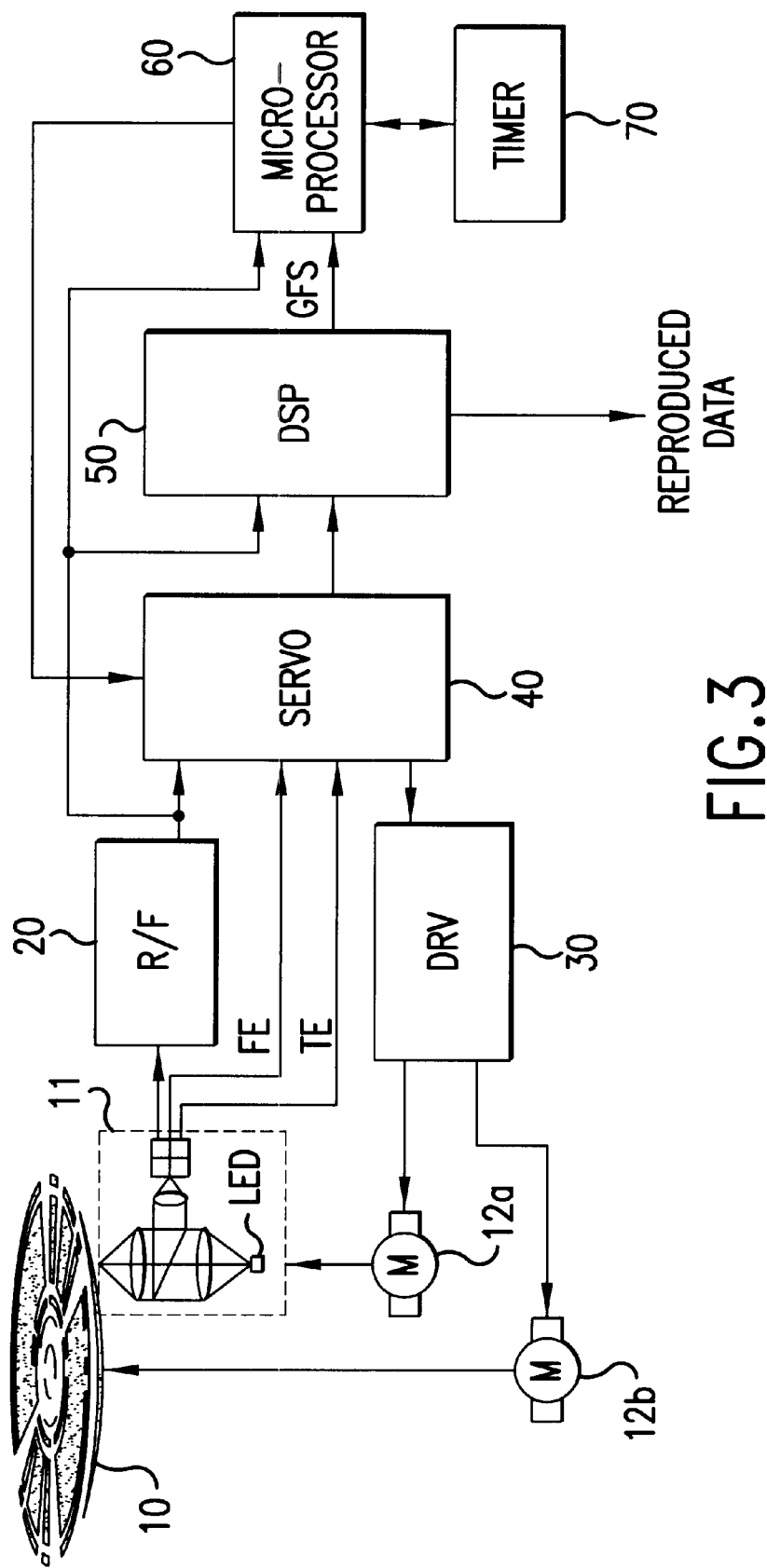
FIG. 3 is a block diagram of an optical information reproducing apparatus in which a preferred embodiment of the invention may be practiced.

FIG. 3 shows a block diagram of an optical information reproducing apparatus in which the present invention may be employed, comprising a pickup 11 for retrieving data recorded on an optical disc 10 using laser beams, a sled motor 12a for moving pickup 11 in the radial direction, a spindle motor 12b for rotating optical disc 10, a drive unit 30 for driving sled motor 12a and spindle motor 12b, an R/F unit 20 for equalizing and shaping signals reproduced from optical disc 10, a servo unit 40 for controlling drive unit 30 utilizing focus and tracking error signals created by pickup 11 and for detecting sync signals from the output of R/F unit 20, a digital signal processing unit 50 for retrieving original digital data from the output signal of R/F unit 20 using the detected sync signals, a timer 70 for measuring the elapse time between specific events, and a microprocessor 60 for controlling the rotation speed of optical disc 10 based on the elapse time measured by the timer 70.

Figure 4:
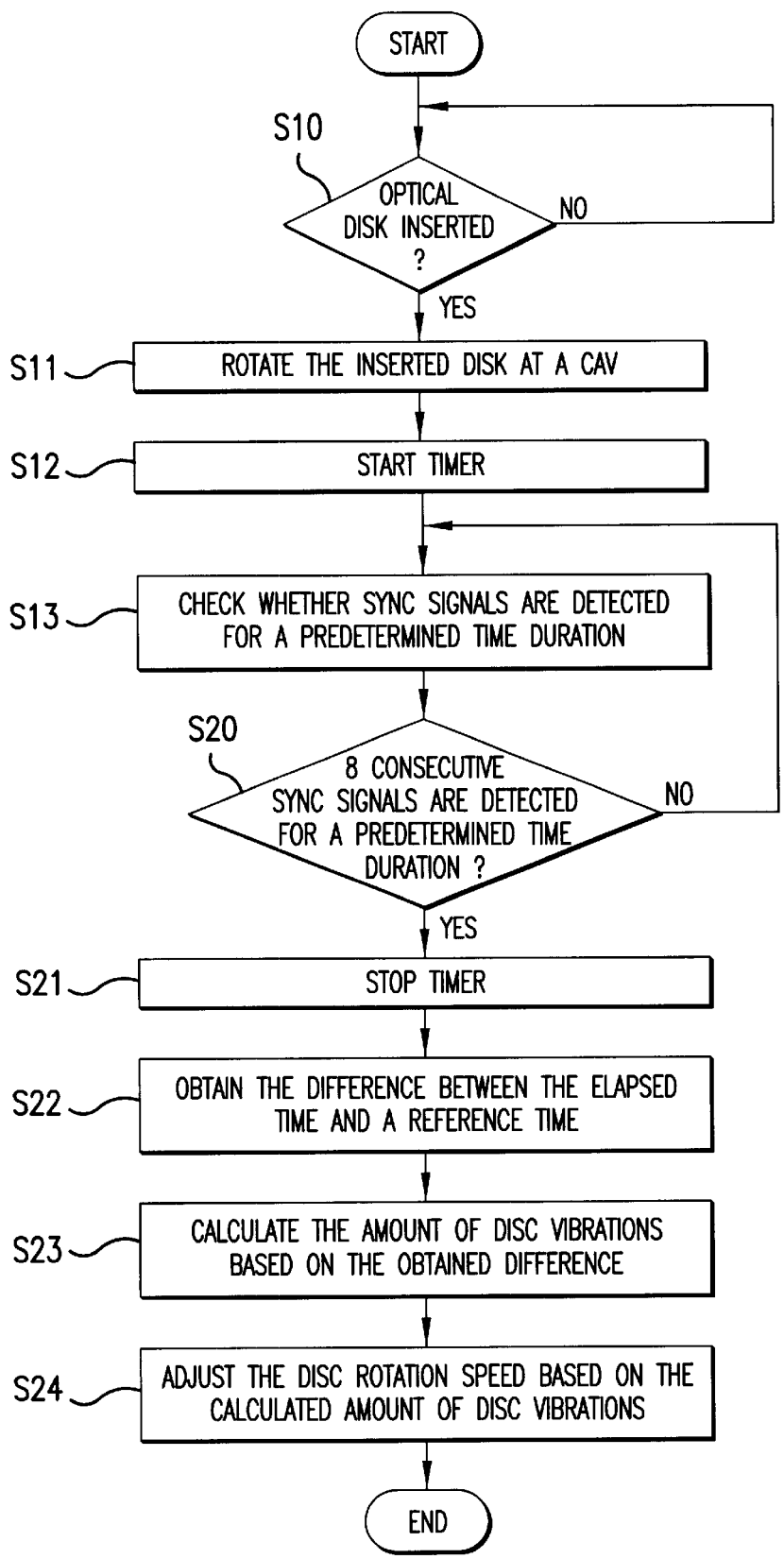
FIG. 4 is a flow diagram of a method for controlling high-speed rotation of optical disc according to a first embodiment of the present invention.

FIG. 4 is a flow diagram of a method for controlling high-speed rotation of optical disc in accordance with a first embodiment of the present invention, which will be described in detail with reference to FIG. 3.

If optical disc 10 is inserted (S10), microprocessor 60 first rotates optical disc 10 at a constant angular velocity (CAV) by driving spindle motor 12b through servo unit 40 and drive unit 30 (S11). Also, microprocessor 60 controls pickup 11 to retrieve recorded data along tracks on optical disc 10 from its initial position and timer 70 to start measuring the time that elapses thereafter (S12).

R/F unit 20 equalizes and shapes high frequency signals received from pickup 11 to create binary signals and servo unit 40 detects sync signals from the binary signals. Utilizing the detected sync signals, digital signal processing unit 50 retrieves original digital data from the binary signals obtained from R/F unit 20.

Figure 5:
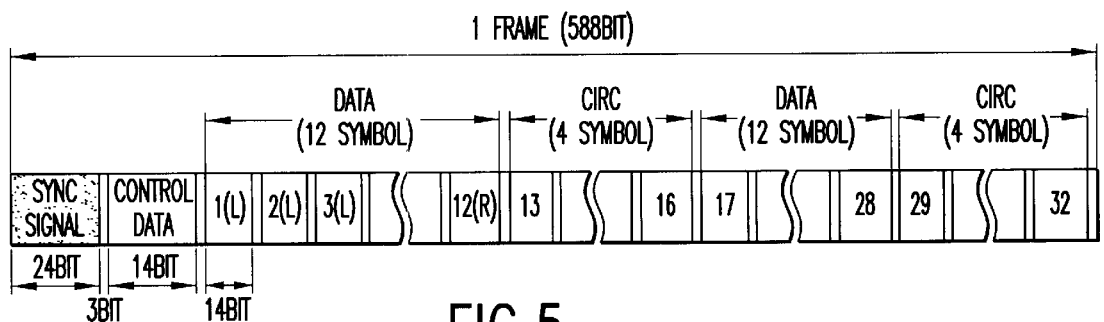
FIG. 5 is a table illustrating the format of a data frame which is the basic data recording unit.
Figure 6:
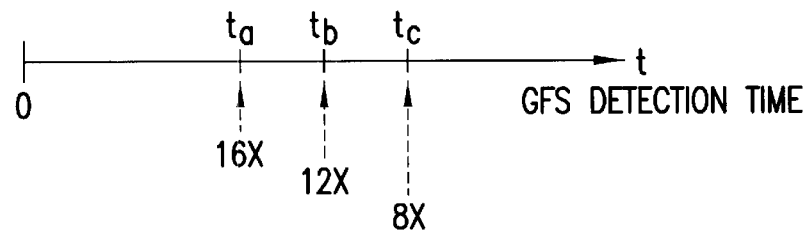
FIG. 6 is a diagram illustrating the relation between the rotation speed of the optical disc and the time that elapses before the GFS signal is detected.

The retrieved digital data is comprised of frames and one frame contains 588-bit data as depicted in FIG. 5. If the rotation speed of optical disc 10 reaches a steady-state value, the 24-bit sync signal in the data frame is detected at constant intervals. Digital signal processing unit 50 checks to determine if eight consecutive sync signals are detected from the retrieved digital data for a predetermined time duration (S13). If eight consecutive sync signals are detected (S20), digital signal processing unit 50 generates a GFS (Good Frame Sync) signal and transmits the GFS signal to microprocessor 60. As shown in FIG. 6, the time that elapses until the GFS signal is generated is inversely proportional to the disc rotation speed. Receiving the GFS signal, microprocessor 60 stops timer 70 (S21).

Figure 7:
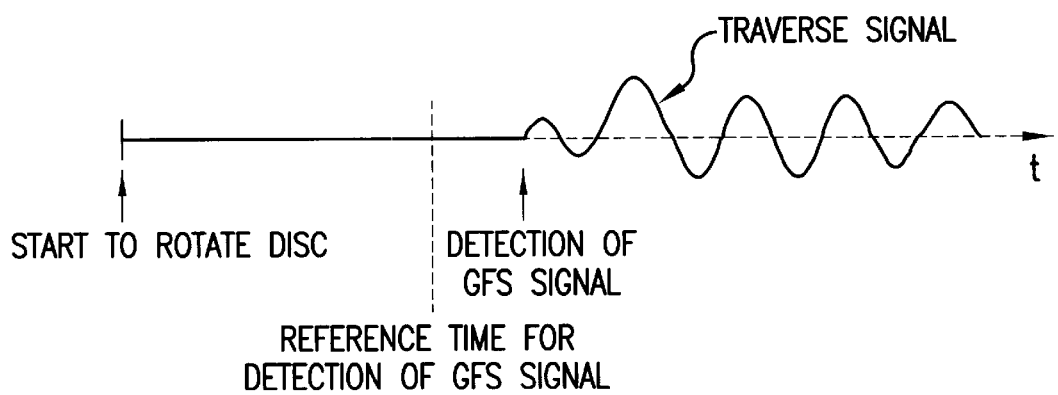
FIG. 7 is a diagram illustrating the typical waveform of a traverse signal.

As shown in FIG. 7, microprocessor 60 calculates the difference between the elapsed time (T1) measured by timer 70 and a preset reference time (T0) (S22) and calculates the amount of disc vibration based on the calculated difference (S23). Since the elapsed time increases in proportion to the amount of disc vibration, the difference is proportional to the amount of disc vibration. Accordingly, microprocessor 60 can calculate the amount of disc vibrations by $$n = k_1 \times (T_1 - T_0)$$

where n is the amount of disc vibration and k1 is a constant obtained through previous experiments. If the calculated amount of disc vibration is within an allowable vibration limit, microprocessor 60 increases the drive voltage applied to spindle motor 12b through servo unit 40 and drive unit 30, thereby rotating optical disc 10 at a maximum speed obtainable under given amount of disc vibration.

Figure 8:
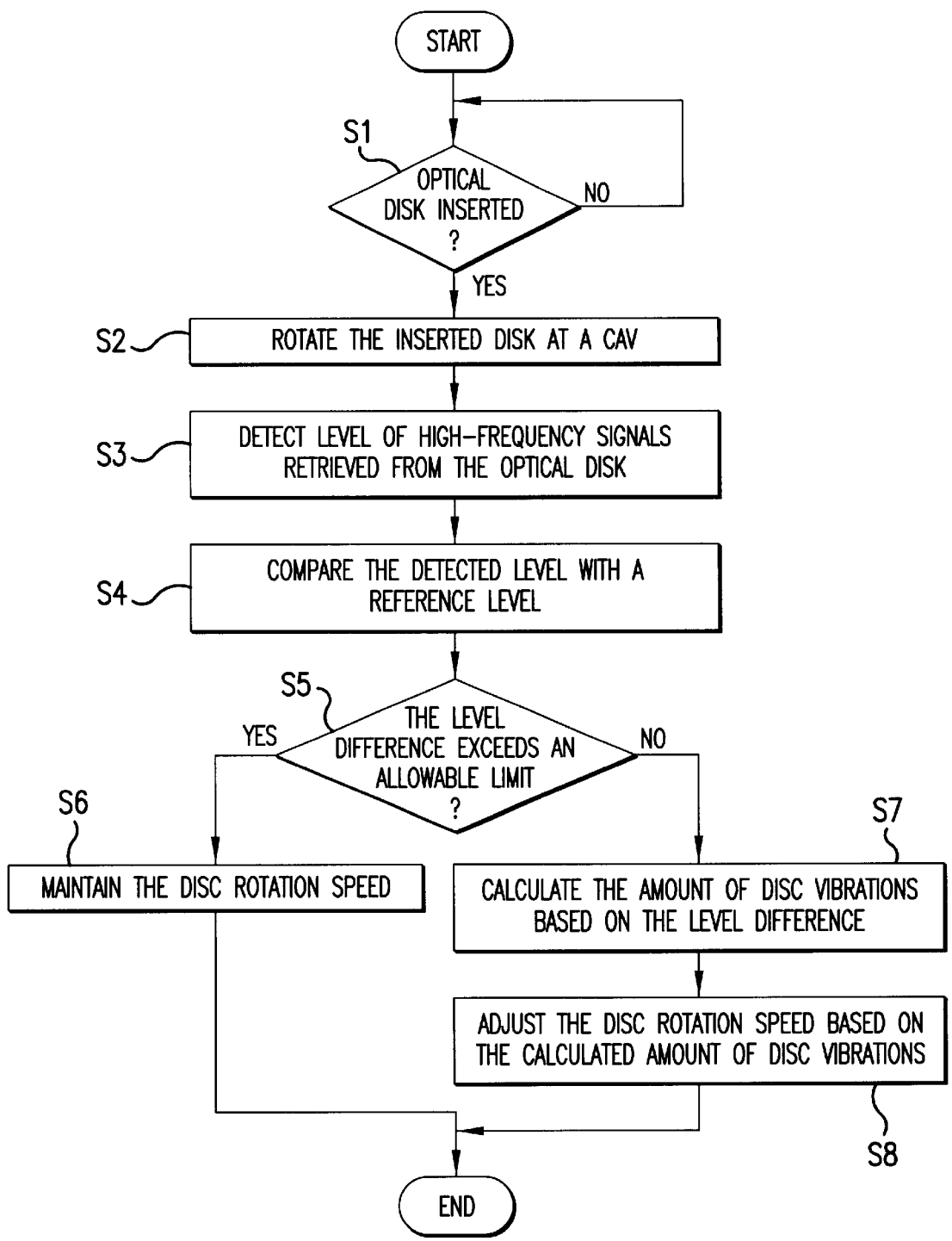
FIG. 8 is a flow diagram of a method for controlling high-speed rotation of optical disc according to a second embodiment of the present invention.

FIG. 8 shows a flow diagram of a method for controlling high-speed rotation of optical disc in accordance with a second embodiment of the present invention, which will be described in detail with reference to FIG. 3.

After optical disc 10 is loaded (S1) and driven to rotate at a constant angular velocity (S2), microprocessor 60 measures the amplitude of high-frequency signals equalized by R/F unit 20 (S3) and compares the amplitude with a preset reference level (S4). If the difference between the measured amplitude and the reference level exceeds a predefined limit value (S5), microprocessor 60 maintains the initial rotation speed of optical disc 10 (S6). Otherwise, microprocessor 60 calculates the amount of disc vibration referring to the difference (S7) and adjusts the rotation speed of optical disc 10 based upon the difference value (S8).

Figure 9:
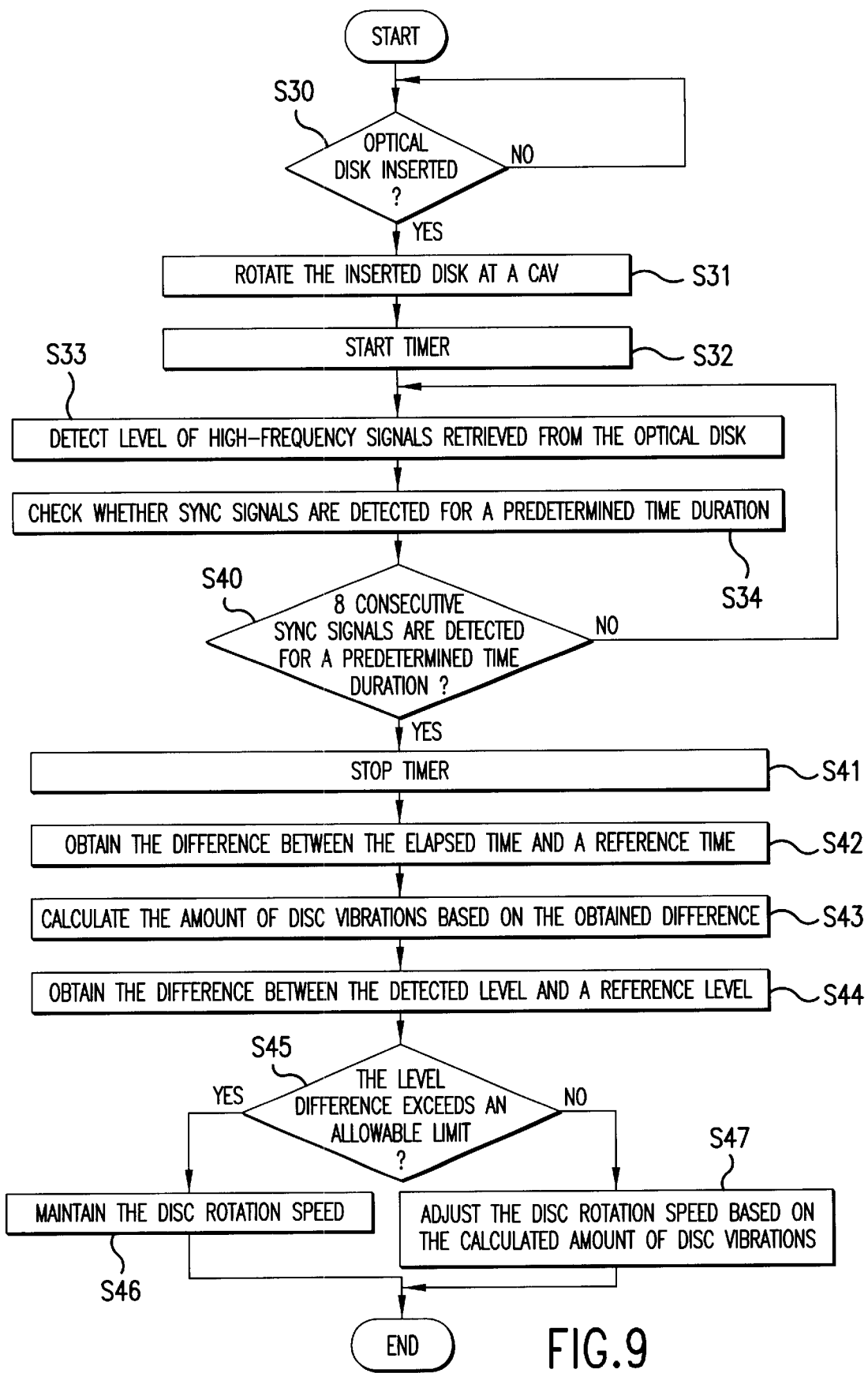
FIG. 9 is a flow diagram of a method for controlling high-speed rotation of optical disc according to a third embodiment of the present invention.

FIG. 9 shows a flow diagram of a method for controlling high-speed rotation of optical disc in accordance with a third embodiment of the present invention, which will be described in detail with reference to FIG. 3.

The method of adjusting the rotation speed of the optical disc is the same as that of the first embodiment shown in FIG. 4. In this embodiment, however, microprocessor 60 measures the amplitude of high-frequency signals equalized by R/F unit 20 and compares the measured amplitude with a reference level as in the second embodiment (S44). If the difference exceeds a preset limit (S45), microprocessor 60 attributes it to defects in optical disc 10 and maintains its rotation speed (S46). The detection of sync signals from frame data cannot be performed normally when there are disc defects, and therefore outputting of the GFS signal is delayed until the defect area has been passed. Consequently, the amount of disc vibration cannot be precisely calculated by the foregoing equation. This is the reason that another step of investigating disc defects is introduced.

If the calculated difference is less than the preset bound in S45, microprocessor adjusts the rotation speed of optical disc 10 based on the amount of disc vibration calculated by the foregoing equation (S47).

Figure 10:
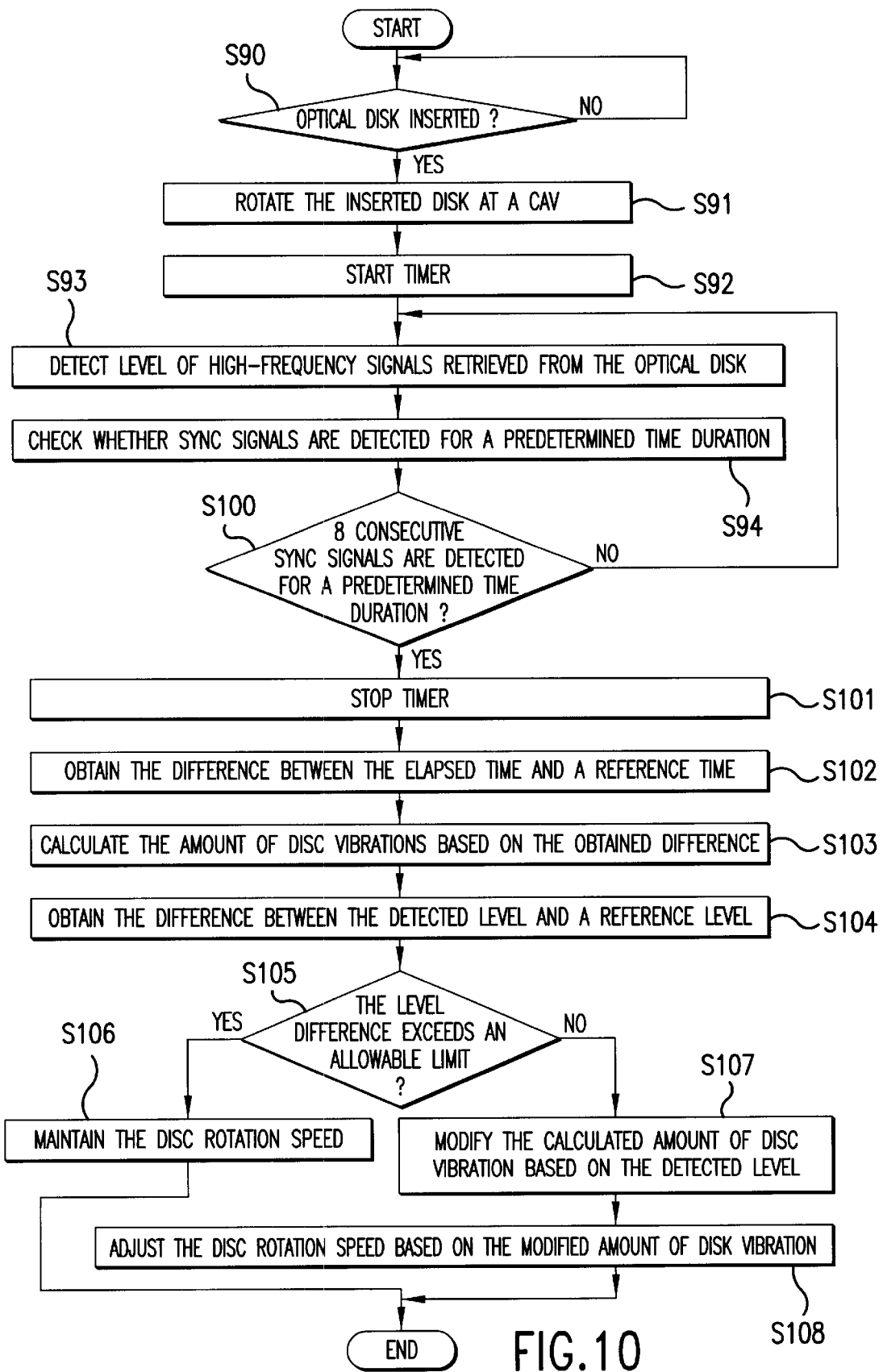
FIG. 10 is a flow diagram of a method for controlling high-speed rotation of optical disc according to a forth embodiment of the present invention.

FIG. 10 shows a flow diagram of a method for controlling high-speed rotation of optical disc in accordance with a fourth embodiment of the present invention. The method of adjusting the rotation speed of the optical disc is the same as that of the first embodiment shown in FIG. 4. In this embodiment, however, microprocessor 60 measures the amplitude of high-frequency signals equalized by R/F unit 20 and compares the amplitude with a preset reference level (S104). If the difference exceeds a preset limit $D_{Th}$ (S105), microprocessor 60 maintains the rotation speed of optical disc 10 (S106). Otherwise, considering the difference, microprocessor 60 modifies the calculated amount of disc vibrations by $$n' = D/D_{Th} \times n, \text{ or } n' = D_{Th}/D \times n,$$

where D is the difference in value between the measured amplitude and the reference level and n is the calculated amount of disc vibration. Finally, microprocessor 60 adjusts the rotation speed of optical disc 10 based on the modified value n' (S108)

Figure 11:
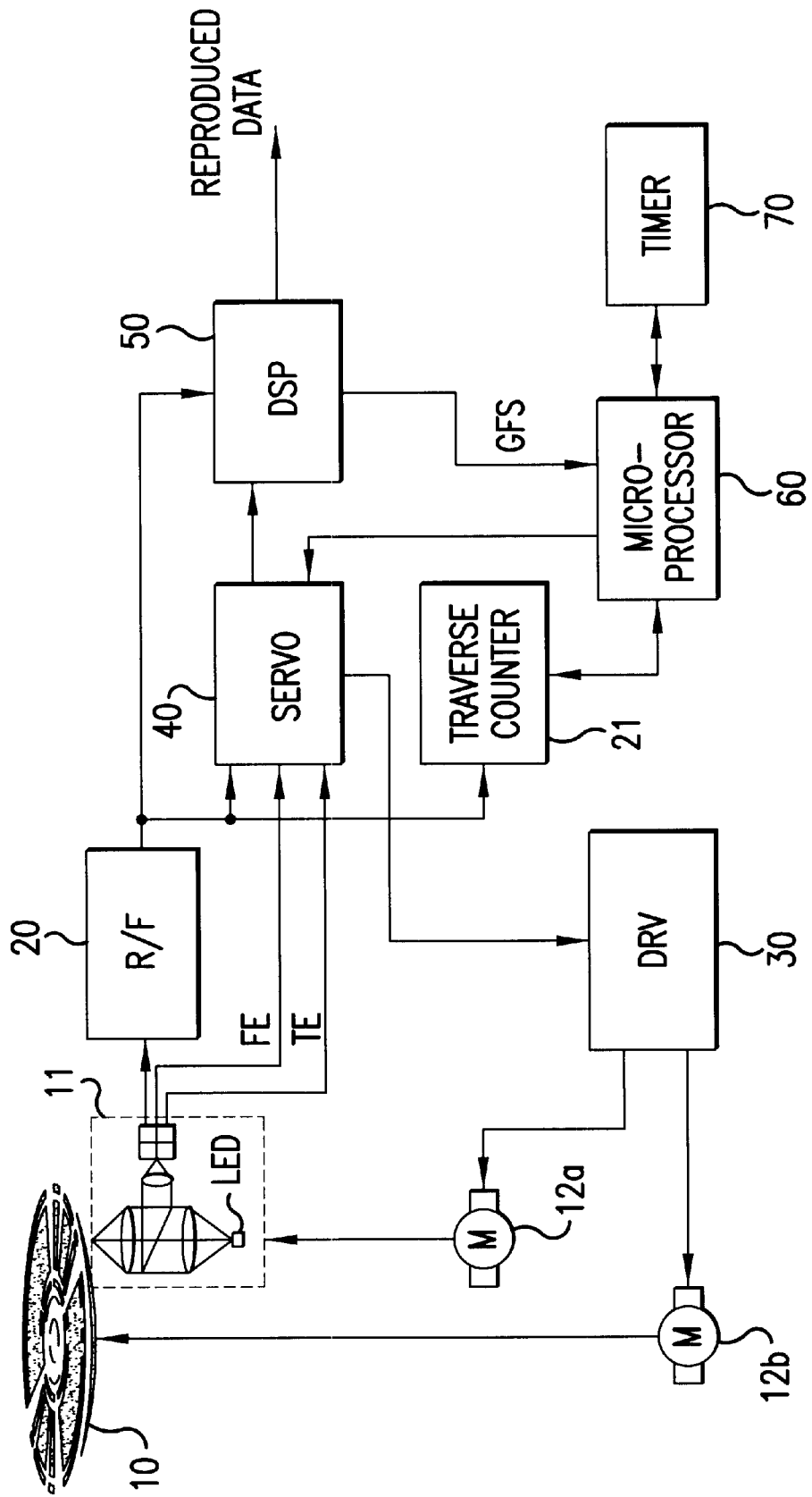
FIG. 11 is a block diagram of an optical information reproducing apparatus in which another preferred embodiment of the invention may be practiced.

FIG. 11 shows a block diagram of an optical information reproducing apparatus in which the present invention may be practiced. The apparatus is identical to the apparatus shown in FIG. 3 except a traverse counter 21 added for detecting traverse signals from the output of R/F unit 20 and counting the number of traverse signals. Microprocessor 60 contains a reference number of traverse signals to be detected for a predetermined time duration and time needed to detect a predetermined number of traverse signals.

Figure 12:
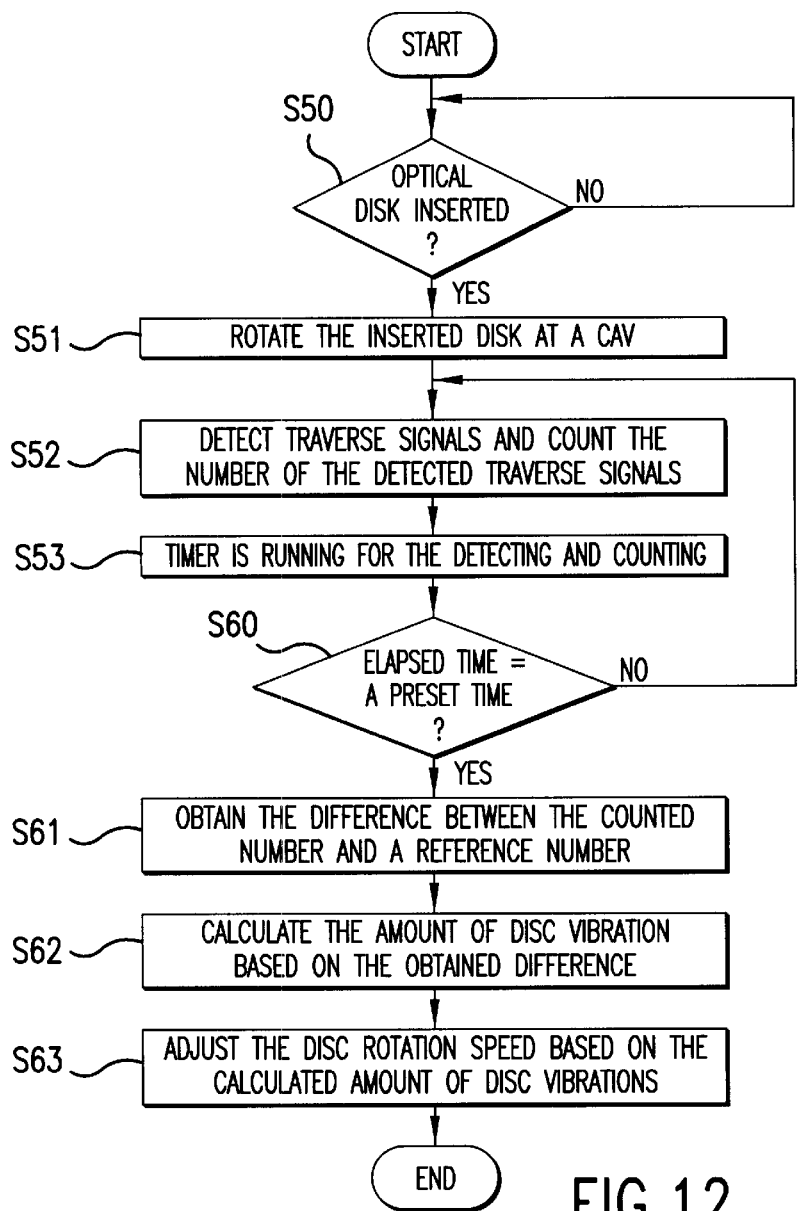
FIG. 12 is a flow diagram of a method for controlling high-speed rotation of optical disc according to a fifth embodiment of the present invention.

FIG. 12 shows a flow diagram of a method for controlling high-speed rotation of optical disc in accordance with a fifth embodiment of the present invention, which will be described in detail with reference to FIG. 11.

After optical disc 10 is loaded and the optical information reproducing apparatus is initialized (S50), microprocessor 60 rotates optical disc 10 at a constant angular velocity by driving spindle motor 12b through servo unit 40 and drive unit 30 (S51) and begins track-following control.

Figure 13:
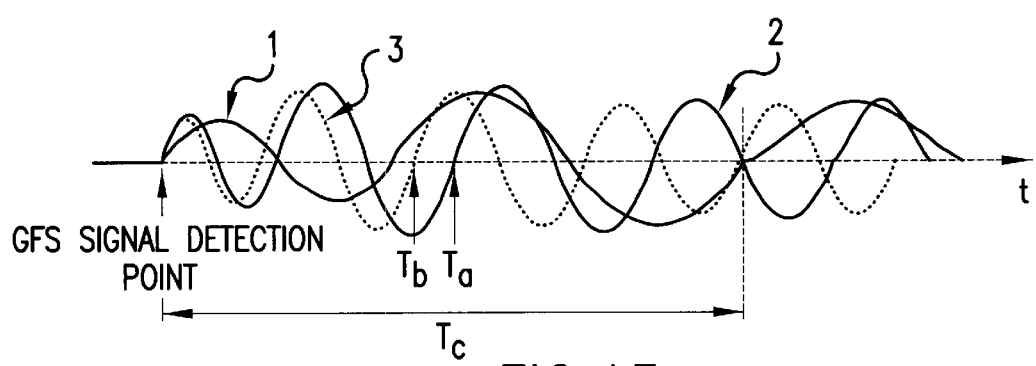
FIG. 13 is a diagram illustrating the waveforms of traverse signals created by different amounts of disc vibration.

If the rotation speed of optical disc 10 exceeds a threshold value and a GFS signal is generated by digital signal processing unit 50, microprocessor 60 activates focusing control only, by suspending track-following control. Without the track-following control, the laser beam spot traverses several tracks and thus a traverse signal is generated each time the laser beam spot traverses a track as shown in FIG. 13.

Traverse counter 21 begins counting the number of detected traverse signals (S52) and timer 70 begins measuring the elapsed time thereafter (S53). Microprocessor 60 continues to compare the elapsed time and a preset reference time Tc shown in FIG. 13 (S60). If the elapsed time reaches the preset reference time, microprocessor 60 commands timer 70 to stop measuring time and compares the number of detected traverse signals and a preset reference value (S61). Microprocessor 60 calculates the amount of disc vibration based on the comparison result (S62). If the counter value does not exceed the reference value, the amount of disc vibration is considered to be 0. For example, if the reference value is 2 and the observed traverse signal is ① in FIG. 13, the amount of disc vibration is calculated to be 0. Otherwise, microprocessor 60 calculates the amount of disc vibrations by $$n=k_2\times(N-2),$$

where N is the number of detected traverse signals, n is the amount of disc vibration, and k2 is a constant obtained through previous experiments. Based on the calculated amount of disc vibration, microprocessor 60 increases or decreases the voltage applied to spindle motor 12b as before, thereby rotating optical disc 10 at a maximum speed obtainable under a given amount of disc vibration (S63).

Figure 14:
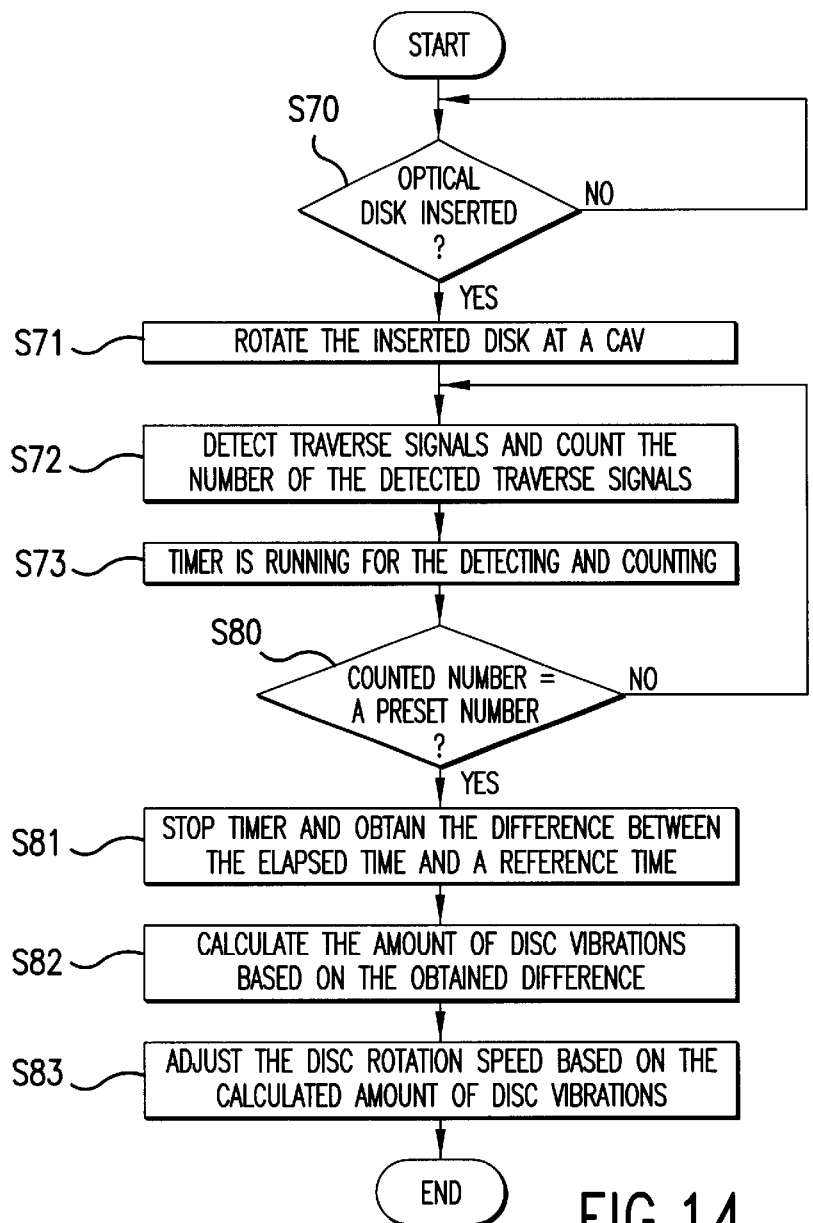
FIG. 14 is a flow diagram of a method for controlling high-speed rotation of optical disc according to a sixth embodiment of the present invention.
Figure 15:
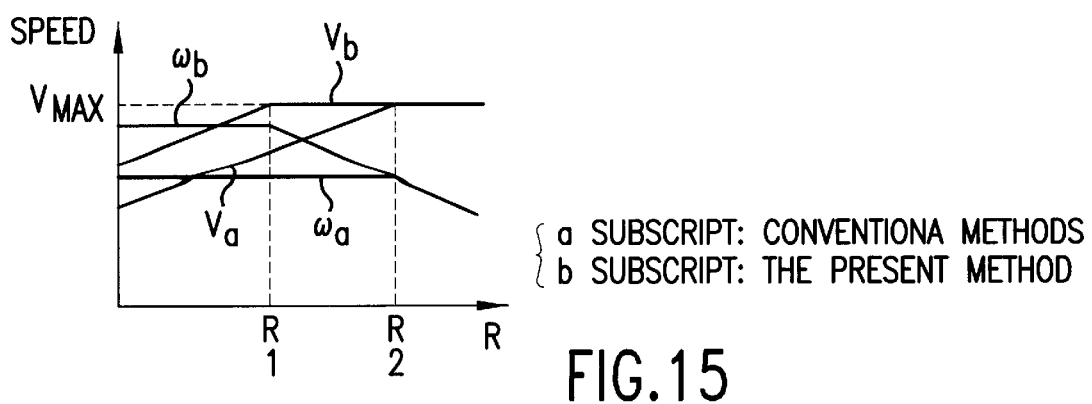
FIG. 15 is a graph illustrating the relation between the disc radius and rotation velocity according to the present invention.

FIG. 14 shows a flow diagram of a method for controlling high-speed rotation of optical disc in accordance with a sixth embodiment of the present invention.

Steps S70 through S73 are preformed as done in FIG. 12. In this embodiment, however, microprocessor 60 compares the number of traverse signals counted by traverse counter 21 with a reference value (S80) instead of comparing the elapsed time. If both values become identical, microprocessor 60 commands timer 70 to stop measuring the elapsed time and compares the elapsed time t with the reference time Tc (S81).

If the elapsed time exceeds the reference time, microprocessor 60 sets the amount of disc vibration to 0. Otherwise, microprocessor 60 calculates the amount of disc vibration by $$n=-k_3\times(t-T_c),$$

where n is the amount of disc vibration, and k3 is a constant obtained through previous experiments (S82). If ② and ③ in FIG. 13 are the observed traverse signals, the elapsed times are Ta and Tb, respectively. Based on the calculated amount of disc vibration, microprocessor 60 increases or decreases the voltage applied to spindle motor 12b, thereby rotating optical disc 10 at a maximum rotation speed under a given amount of disc vibration (S83).

The invention may be embodied in other specific forms without departing from the sprit or essential characteristics thereof. For example, the preferred embodiments of FIG. 4 and FIG. 12 can be embodied as one embodiment. Also, the tracking error signal can be used instead of the traverse signal in the preferred embodiments. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for controlling the rotational speed of an optical medium, comprising the steps of:
   (a) detecting track traverse signals after a predetermined signal is detected from a loaded optical disk;
   (b) measuring the exact amount of disc vibration based on the detected track traverse signals; and
   (c) adjusting the rotation speed of the optical disc based on the measured amount of disc vibration.

2. A method of claim 1, wherein the predetermined signal is generated if sync signals recorded on the optical disc are normally detected.

3. A method of claim 1, wherein said step (b) calculates the number of the track traverse signals detected during a predetermined reference time.

4. A method of claim 1, wherein said step (b) calculates an elapsed time until the number of the detected track traverse signals equals a predetermined reference number.

* * * * *